United States Patent [19]

Tsujisawa

[11] Patent Number: 4,788,608
[45] Date of Patent: Nov. 29, 1988

[54] HEAD POSITIONING SYSTEM FOR POSITIONING A MAGNETIC HEAD ON AN ECCENTRIC TARGET TRACK

[75] Inventor: Takahiko Tsujisawa, Tokyo, Japan

[73] Assignee: NEC Corporation, Tokyo, Japan

[21] Appl. No.: 921,514

[22] Filed: Oct. 22, 1986

[30] Foreign Application Priority Data

Oct. 22, 1985 [JP] Japan .................................. 60-234544
Feb. 17, 1986 [JP] Japan .................................. 61-30709

[51] Int. Cl.$^4$ .......................... G11B 5/596; G11B 5/55
[52] U.S. Cl. .......................................... 360/77; 360/78
[58] Field of Search .................... 360/77, 78; 318/685, 318/696

[56] References Cited

U.S. PATENT DOCUMENTS 4,223,347  9/1980  Bouwhuis et al. .................... 360/77
4,414,497  11/1983  Song .................................... 318/696

Primary Examiner—Raymond F. Cardillo
Assistant Examiner—David L. Robertson
Attorney, Agent, or Firm—Sughrue, Mion, Zinn, Macpeak & Seas

[57] ABSTRACT

A head positioning system for driving a magnetic disk from its current track to a target track in the radial direction of a magnetic disk. The positioning system employs a closed loop servo system including a compensation digital filter for generating a compensation signal whose frequency is synchronized with a higher frequency component of the track eccentricity. The system is effective in positioning the magnetic head at the center line of a target track with a high degree of accuracy even if the track is eccentric and in increasing the track density of the disk.

7 Claims, 3 Drawing Sheets

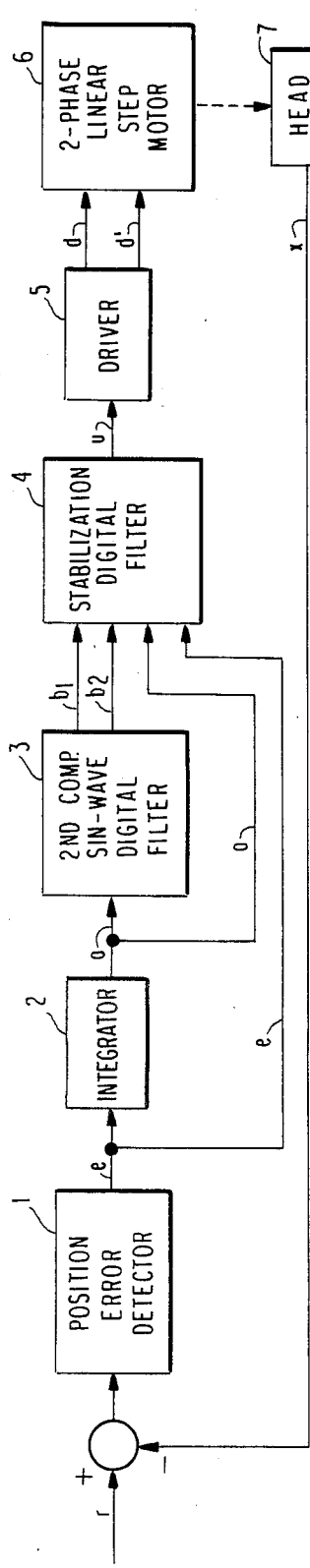
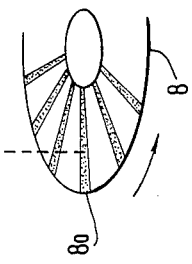
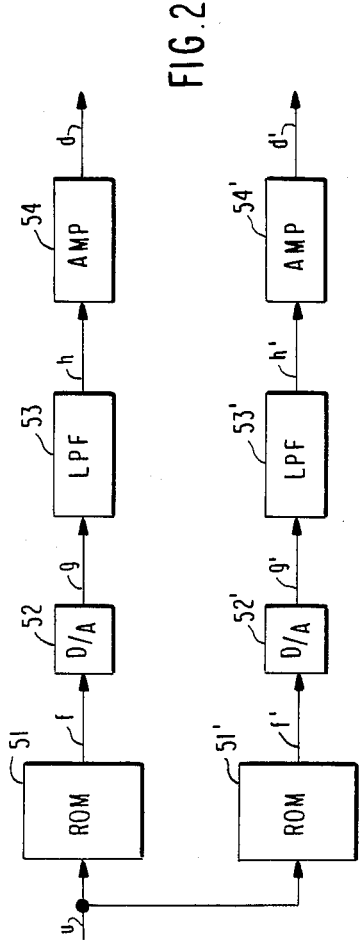
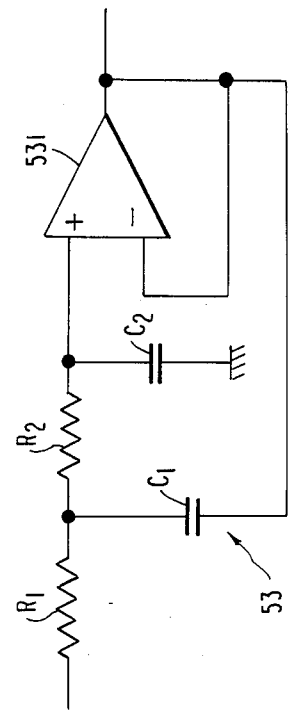
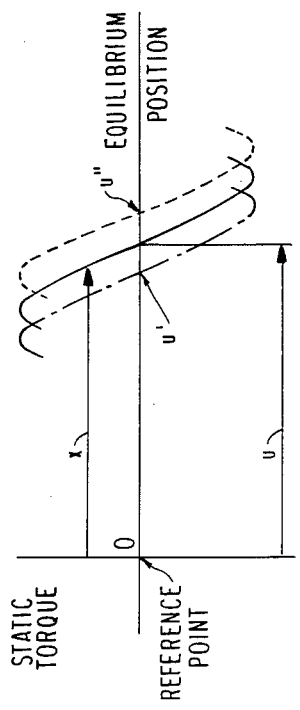

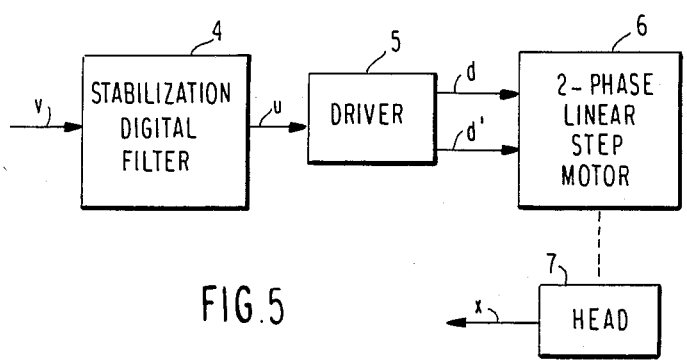
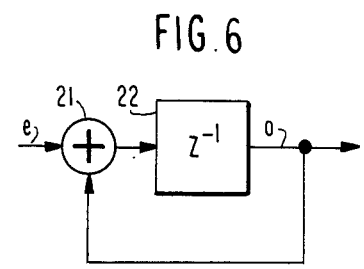
FIG.5      FIG.6
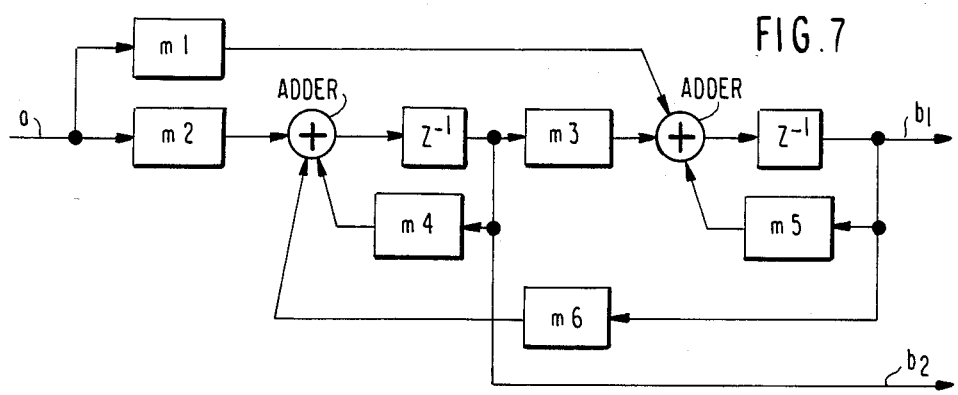
FIG.7
FIG.8
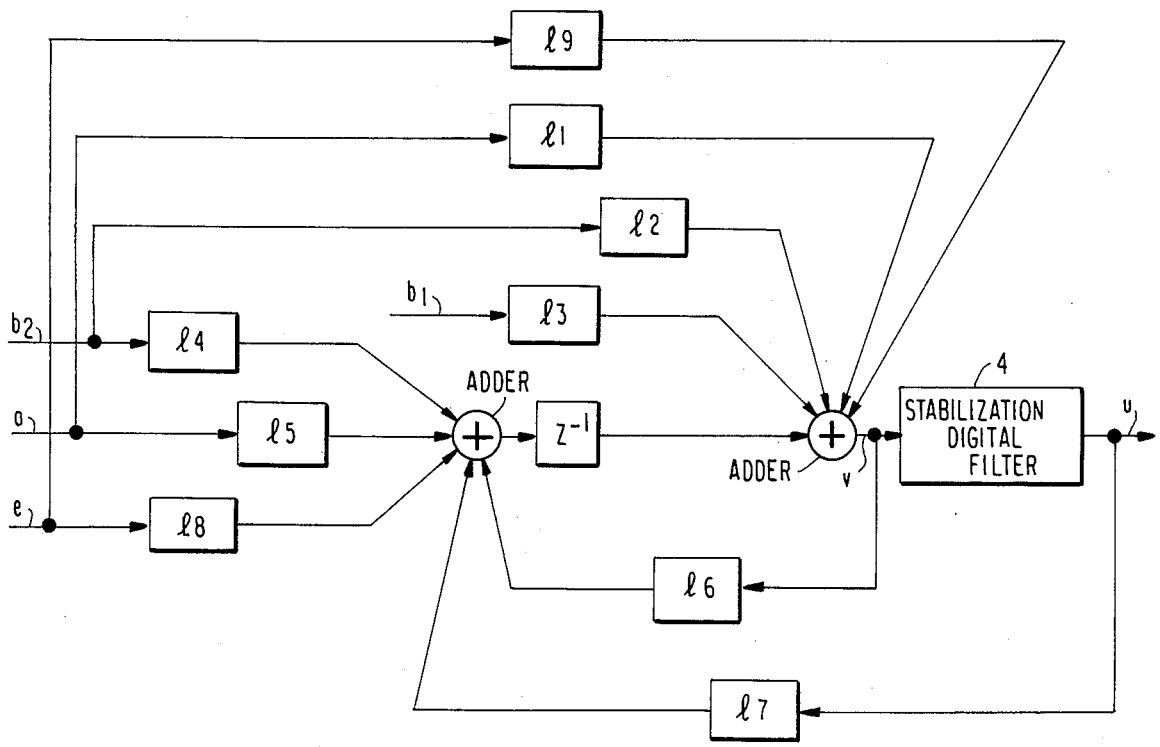

HEAD POSITIONING SYSTEM FOR POSITIONING A MAGNETIC HEAD ON AN ECCENTRIC TARGET TRACK

BACKGROUND OF THE INVENTION

The present invention relates to a head positioning system which drives a magnetic head from a current track to a target track in the radial direction of a magnetic disk. More particularly, the present invention relates to a head positioning system for floppy disk drives employing a closed loop servo control for positioning the magnetic head.

In a conventional floppy disk drive, the magnetic head is driven to a target track of the floppy disk by an open-loop controlled step motor. For this reason, the track width is determined by the drive pitch of the step motor and is relatively wide enough to render negligible the effects of track eccentricity. The track eccentricity includes a first component caused by disk exchange, which has the same frequency as that of the disk rotation, and a second component caused by environmental change, such as temperature and humidity changes, which has twice the frequency of the disk rotation.

In order to increase the recording capacity of the floppy disk, the track density must be increased, i.e., the track width must be reduced. However, an open loop head positioning system cannot realize a drastic reduction in the track width since the possible amount of reduction of the drive pitch of the step motor is mechanically limited and since the track eccentricity will not be negligible at a high track density.

A head positioning system employing a closed loop servo for a floppy disk drive is proposed in Japanese Patent Disclosure No. 58-151613. In this system, each of a plurality of tracks is divided into a plurality of sectors. The servo information is recorded at the leading position of each of the sectors. A magnetic head reads the servo information and supplies it to a closed loop servo controller. The controller enables a fine step motor to move the magnetic head radially to a position near the center line of a target track in accordance with the servo information. The fine step motor moves the magnetic head by a pitch which is narrower than the track width every time the servo information is obtained. Thus, a fine track following operation is carried out using only servo information obtained from the leading portion of each of the sectors.

The sampling time of the servo information is determined by the speed of disk rotation and the number of sectors, both of which are predetermined. Accordingly, the sampling time cannot be shortened and is too long to permit the magnetic head to follow the second component of the track eccentricity with a high degree of accuracy. As a result, the conventional head positioning system cannot accurately position the magnetic head at the center line of the target track and as a result the track density must remain relatively low.

SUMMARY OF THE INVENTION

Therefore, an object of the present invention is to provide a head positioning system capable of positioning the magnetic head at the center line of a target track with a high degree of accuracy even if the target track is eccentric.

Another object of the present invention is to provide a head positioning system capable of increasing the track density of the disk.

A head positioning system according to the present invention includes a compensation digital filter that generates a compensation signal whose frequency is synchronized with the track eccentricity.

BRIEF DESCRIPTION OF THE DRAWING

FIG. 1 is a block diagram of a head positioning system according to a first embodiment of the present invention;

FIG. 2 is a block diagram of a motor driver used in the head positioning system shown in FIG. 1;

FIG. 3 shows the relationship between equilibrium position and static torque of a step motor;

FIG. 4 is a circuit diagram of a low pass filter used in the motor driver shown in FIG. 2;

FIG. 5 is a block diagram of a controlled object shown in FIG. 1;

FIG. 6 is a block diagram showing the transfer function of the integrator used in the head positioning system shown in FIG. 1;

FIG. 7 is a block diagram showing the transfer function of a second component sine-wave digital filter used in the head positioning system shown in FIG. 1;

FIG. 8 is a block diagram showing the transfer function of a stabilization digital filter used in the head positioning system shown in FIG. 1;

DESCRIPTION OF THE PREFERRED EMBODIMENTS

Figure 9:
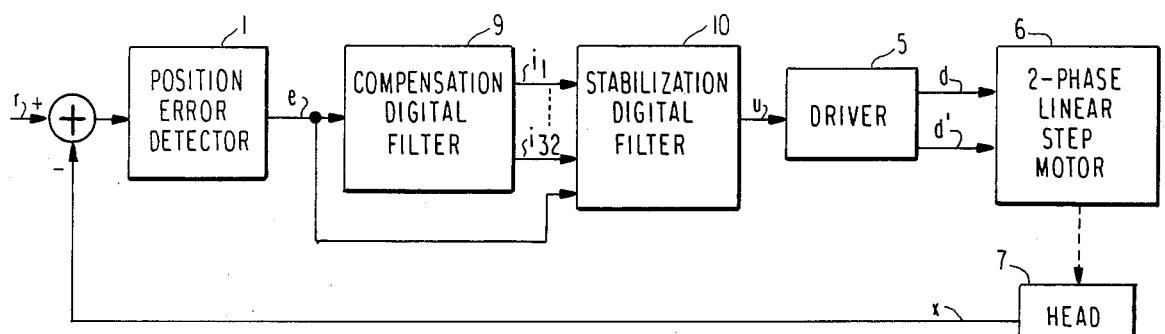
FIG. 9 is a block diagram of a head positioning system according to a second embodiment of the present invention.

FIG. 1 shows a head positioning system according to a first embodiment of the present invention. A position error detector 1 is provided with a reference signal r and a head position signal x to generate a position error signal e. The reference signal r represents a target track on which the magnetic head 7 is to be positioned. The head position signal x is obtained from a magnetic head 7 which reads servo information from servo areas 8a of a floppy disk 8. The recording area of a floppy disk 8 is divided into 32 sectors each having the servo area 8a at its leading portion. The disk rotation speed of the disk 8 is set at 300 r.p.m. (5 Hz). Accordingly, the head position signal x is obtained at sampling times T which occur every 6.25 msec. The position error detector 1 generates the position error signal e, which represents the difference between the reference signal r and the head position signal x, and supplies the signal e to an integrator 2 and a stabilization digital filter 4 at every sampling time T.

The integrator 2 integrates the error signal e at every sampling T to generate an integrated value a. The integrated value a is supplied to a second component sine-wave digital filter 3 and the stabilization digital filter 4.

The sine-wave digital filter 3 generates a sine-wave whose frequency is the same as the second component of the track eccentricity. As described previously, the second component is caused by temperature changes, humidity changes, and so on. In detail, the second component eccentricity stems from the fact that the track is deformed into an oval shape. Accordingly, the second component has a frequency twice the disk rotation frequency. Since the disk rotation frequency is set at 5 Hz, the digital filter generates a sine-wave of 10 Hz. The sine-wave generation is triggered by an impulse input.

The stabilization digital filter 4 calculates an equilibrium point u in accordance with the error signal e, the integrated value a and the outputs $b_1$ and $b_2$ of the digital filter 3. The calculating time period for the equilibrium point u is set at a constant value $\Delta(=0.5 \text{ msec})$. The stabilization digital filter 4 supplies the equilibrium point u to a motor driver 5 during periods equal to the sampling interval T. The stabilization digital filter 4 acts as a phase-compensator for stabilizing the feedback control system, as is known in the art.

The motor driver 5 supplies drive currents d and d' to each phase of a 2-phase linear step motor 6, in accordance with the equilibrium point u. As is well known, an appropriate combination of the 2-phase motor currents can stop the step motor at an arbitrary position. The motor driver 5 thus moves the motor 6 to position the magnetic head 7 at the target track.

The magnetic head 7 reads the servo information from the servo area 8a at the next sampling time T. The updated head position signal x is supplied to the position error detector 1.

FIG. 2 shows a block diagram of the motor driver 5 which includes read only memories (ROMs) 51 and 51' for storing current values f and f' to be applied to the two phases of the motor 6. Appropriate current values f and f' are read out in accordance with the equilibrium point u. The current values f and f' in digital form are converted into analog form by digital to analog (D/A) converters 52 and 52'. Low pass filters (LPF) 53 and 53' cut off frequencies higher than the Nyquist rate of the output signals g and g' of the D/A converters 52 and 52'. Amplifiers 54 and 54' amplify the ouput signals h and h' of the LPFs 53 and 53' to generate the drive currents d and d'.

The current values f and f' can be determined in the following manner. Assume the reference equilibrium position of the step motor 6 is "0" as shown in FIG. 3, where a drive current of +0.1 ampere is applied to both phases of the step motor 6, for instance. Here, +0.1 ampere is a drive current which yields enough force to hold the position of the step motor 6 at the reference equilibrium position O. The equilibrium position u shows the next equilibrium position after the reference equilibrium position, when a drive current of +0.1 ampere is applied to both phases of step motor 6.

The curve which passes through the position u depicted in FIG. 3 describes a static torque characteristic of the step motor 6, when a drive current of +0.1 ampere is applied to both phases. Adjacent equilibrium positions u' and u'' of the step motor 6 can be obtained by applying drive currents different from the drive current for the equilibrium position u.

The drive current values f and f' at the equilibrium positions u' and u'' are determined such that the static torque characteristic at the position u' and u'' are equal to that at the position u. In the step motor, there is always a combination of the current values f and f' at an arbitrary equilibrium position such that the static torque characteristic at the arbitrary equilibrium position is equal to that at the position u. The current values f and f' are determined by the distance between the reference equilibrium position u and an arbitrary equilibrium position. For example, when the distance of an equilibrium position is $\lambda/8$, the current values of f and f' are set at 0 ampere and $(0.1 \times 2)$ amperes, respectively, wherein $\lambda$ is the tooth pitch of the step motor 6.

FIG. 4 shows the circuit diagram of the LPF 53 shown in FIG. 2. The other LPF 53' is the same as the LPF 53. The LPF 53 includes resistors $R_1$ and $R_2$, condensers $C_1$ and $C_2$ and a differential amplifier 531, as is well known in the art. The LPF 53 is represented by a 2-order transfer function $G_{lp}(S)$ as follows:

$$G_{lp}(S) = \frac{\omega^2}{S^2 + 2\zeta\omega + \omega_0^2} \quad (1)$$

$$= 1/\sqrt{C_1 \cdot C_2 \cdot R_1 \cdot R_2} \quad (2)$$

$$= \frac{C_2 \cdot (R_1 + R_2)}{2\sqrt{C_1 \cdot C_2 \cdot R_1 \cdot R_2}} \quad (3)$$

wherein S represents an operator of a Laplace transform.

Referring to FIG. 5, the relationship between the equilibrium point u and the head position (=step motor position) x is as follows:

$$M(d^2x/dt^2) + kx = ku \quad (4)$$

$$k = (F\pi/2\lambda) \quad (5)$$

wherein M represents a mass driven by the step motor 6 and F represents the maximum static torque of the step motor 6.

In FIG. 5, the equilibrium point u is represented by the calculation result v and the calculation time $\Delta$. The discrete state equilibrium for the system shown in FIG. 5 are as follows:

$$X((N+1)T) = A \cdot X(NT) + B \cdot v(NT) \quad (6\text{-a})$$

$$Y(NT) = C \cdot X(NT) \quad (6\text{-b})$$

$$(N = 0, 1, 2, \ldots)$$

In equations (6-a) and (6-b), coefficient matrices A, B and C are as follows:

$$A = \begin{bmatrix} \exp(\Phi T) & , & \exp(\Phi(T-\Delta)) & \int_0^\Delta \exp(\Phi\tau)d\tau \cdot \Lambda \\ 0 & , & 0 \end{bmatrix}$$

$$B = \begin{bmatrix} \int_0^{T-\Delta} \exp(\Phi\tau) \, d\tau \cdot \Lambda \\ 1 \end{bmatrix}$$

$$C = \begin{bmatrix} 1 & 0 & 0 \\ 0 & 0 & 1 \end{bmatrix}$$

wherein $$\Phi = \begin{bmatrix} 0 & 1 \\ -k/m & 0 \end{bmatrix}$$

-continued $$\Lambda = \begin{bmatrix} 0 \\ k/m \end{bmatrix}$$

Further, state vector X(NT) and output vector Y(NT) are represented as follows:

$$X(NT) = [X(NT), \beta(NT), u(NT)]^T$$

$$Y(NT) = [X(NT), u(NT)]^T$$

wherein $\beta$ represents the velocity of the magnetic head 7. As is known in the art, the system represented by the equations (6-a) and (6-b) is controllable and observable with observability indices "2".

FIG. 6 illustrates the function of the integrator 2 by using an operator 2 of the Z-transform. The integrator 2 includes an adder 21 and a shift register 22. The shift register 22 integrates the output of the adder 21 and outputs the integrated value a very sampling time T.

FIG. 7 is a block diagram representing the transfer function of the second component sine-wave digital filter 3 using an operator of the Z-transform. The sine-wave digital filter 3 is provided to enable the magnetic head to follow the second component of the track eccentricity even if the sampling frequency is relatively low.

In FIG. 7, the pulse transfer function $G_{sin}(z)$ from the integrated value a to the output b, is represented by real constants m1, m2, m3, m4, m5 and m6 as follows:

$$G_{sin}(z) = \frac{m/z - m1 \cdot m4 + m2 \cdot m3}{z^2 - (m4 + m5)z + m4 \cdot m5 - m3 \cdot m6} \quad (7)$$

In this embodiment, since the frequency of the second component of the track eccentricity is 10 Hz, real constants m1 to m6 are determined as follows by using the formula $(1/S^2 + 3948)$, which is obtained from $(1/(20\pi)^2) \sin(20\pi \cdot t)$ by Laplace transform, with the sampling time T (=6.25 msec):

$m1 = 1.9282 \times 10^{-5}$ $m3 = 6.0906 \times 10^{-3}$ $m5 = 0.92388$ $m2 = 6.0906 \times 10^{-3}$ $m4 = 0.92388$ $m6 = -24.046$ Referring again to FIG. 1, pulse transfer function W(z) from the reference signal r to the head position x for one cycle is represented as follows since it inclues the pulse transfer function $G_{sin}(z)$ and that of the integration (=1/z-1)):

$$W(z) = \frac{(z-1)\{z^2 - (m4+m5)z + m4 \cdot m5 - m3 \cdot m6\}\gamma(z)}{\delta(z)} \quad (8)$$

wherein $\delta(z)$ and $\gamma(z)$ represents respectively, $\sigma$-order and $(\sigma-3)$-order real coefficient polynomials whose solutions of $\delta(z)=0$ all exist in the unit circle of the Z-plane.

According to formula (8), the final value theorem of the Z-transform and the frequency of the second component of the track eccentricity, the position error e is represented as follows:

$$\lim_{t \to \infty} e(t) =$$

$$\lim_{z \to 1} (1 - z^{-1}) \cdot$$

$$W(z) \frac{Kz}{z^2 - (m4 + m5) \cdot z + m4 \cdot m5 - m3 \cdot m6} = 0$$

(K = real constant)

The magnetic head thus follows the center line of a target track, i.e., the track eccentricity, with high accuracy.

FIG. 8 is a block diagram representing the transfer function of the stabilization digital filter 4. As described above, since the system shown in FIG. 5 is controllable and observable and its observability indices are "2", the system can be stabilized by a first order stabilization digital filter, as is known in the art. In this case, $\delta(z)$ in formula (8) is "7". In FIG. 8, real constants 1 to 9 are determined in accordance with the observer theory or the state feedback theory. The polynomial $\delta(z)$ in formula (8) is arbitrarily determined by the real constants 1 to 9. Accordingly, the system shown in FIG. 1 can be stabilized.

FIG. 9 shows a second embodiment of the present invention in which the same elements and signals in the figure bear the same reference numerals as in FIG. 1.

The position error signal e from the position error detector 1 is supplied to a compensation digital filter 9 and a stabilization digital filter 10. The compensation digital filter 9 has a plurality of outputs $i_1$ to $i_{32}$ which correspond to the number of sectors. The stabilization digital filter 10 calculates the equilibrium point u and supplies it to the motor driver 5.

Figure 10:
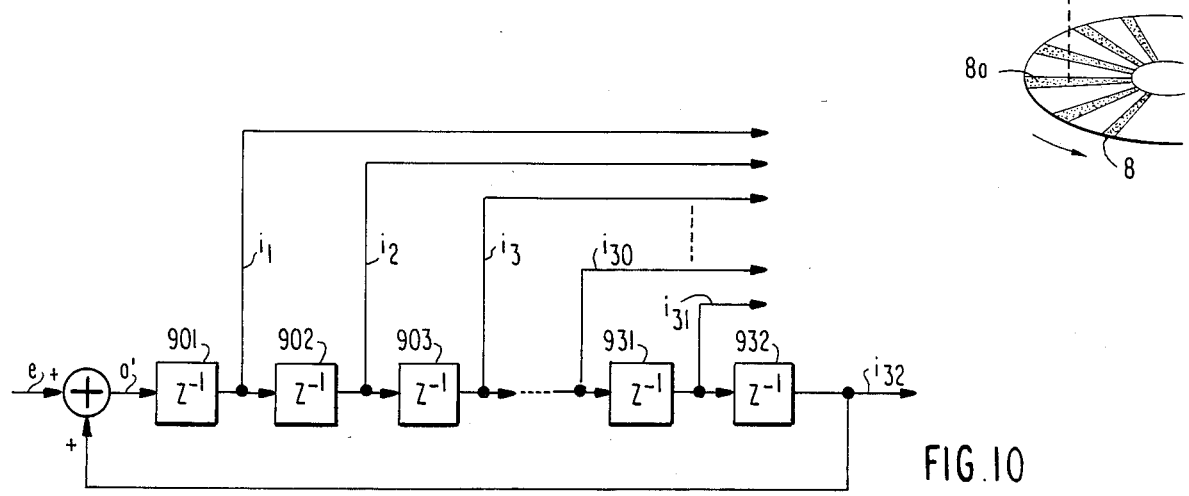
FIG. 10 is a block diagram of a compensation digital filter used in the head positioning system shown in FIG. 9.

Referring to FIG. 10, the compensation digital filter 9 includes a plurality of shift registers 901 to 932. The number of the shift registers is the same as the number of sectors on the floppy disk 8, i.e., "32". The contents of the shift registers 901 to 932 are cyclically shifted to the next shift registers, respectively, in synchronization with the sampling timing T. The content of the shift register 932 is added to the position error signal e and stored in the shift register 901. Accordingly, the position error signal obtained at the time 32T before and the current position error signal e are added and stored in the shift register 901.

Pulse transfer function $G_{zo}(z)$ from the position error signal e to the output $i_{32}$ of the compensation digital filter 9 is represented as follows:

$$G_{zo}(Z) = (1/z^{32} - 1) \quad (9)$$

The outputs $i_1$ to $i_{32}$ of the shift registers 901 to 932 are supplied to the stabilization digital filter 10.

Figure 11:
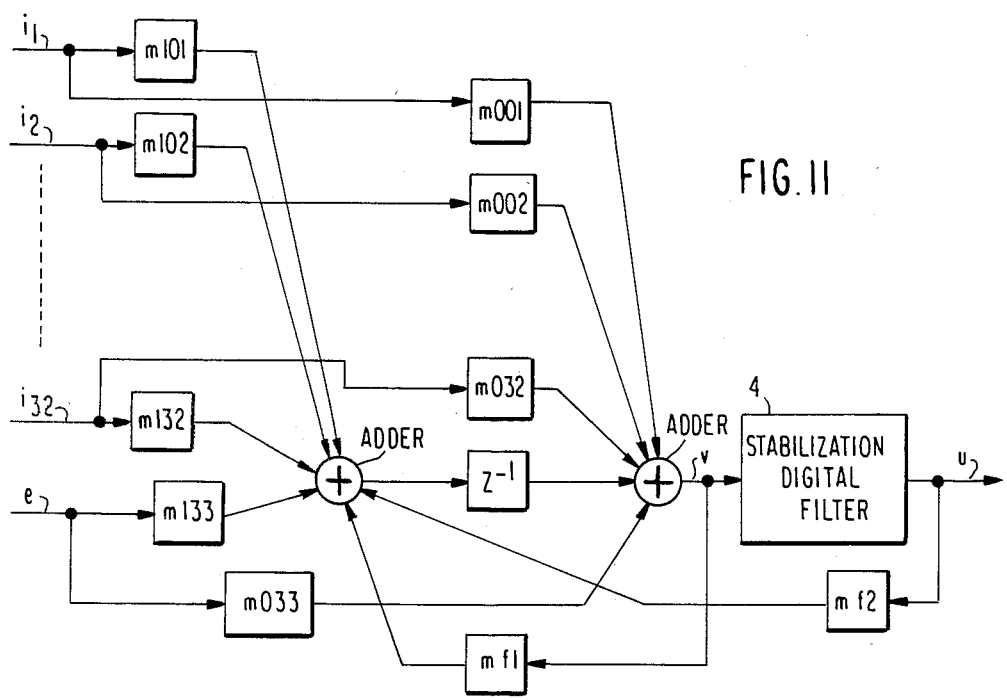
FIG. 11 is a block diagram showing the transfer function of a stabilization digital filter used in the head positioning system shown in FIG. 9.

FIG. 11 is a block diagram representing the transfer function of the stabilization digital filter 10 using the operator Z of the Z-transform. The controlled system whose pulse transfer function is represented by equations (6-a), (6-b) and (9) is also controllable and observable and its observability indices are "2". Therefore, the system can be stabilized by determining real constants $m_{001}$ to $m_{033}$, $m_{101}$ to $m_{133}$, $m_{f1}$ and $m_{f2}$ at appropriate values.

Pulse transfer function $G_{re}(z)$ from the reference signal r to the position error signal e of the system shown in FIG. 9 is as follows:

$$G_{re}(z) = \frac{N_{re}(z)}{D_{re}(z)} \quad (10)$$

$$N_{re}(z) = (Z^{32} - 1) N_{re}'(z) \quad (11)$$

wherein $D_{re}(z)$ represents a 36 (4+32)-th order real coefficient polynomial of z whose solutions of $D_{re}(z)=0$ all exist in the unit circle of the Z-plane, and $N_{re}'(z)$ represents a 4-th order real coefficient polynomial of z. It is noted that $(Z^{32}-1)$ is included in the denominator of the pulse transfer function $G_{re}(z)$.

The solutions of $(Z^{32}-1=0)$ in the frequency(s) area are as follows:

$$\theta^{st}(T=1/32\theta)$$

wherein $\theta$ represents the disk rotation frequency.

Accordingly, $$e^{32ST} = 1$$

$$S = \pm jp \cdot 2\pi/32T$$
$$= \pm jp \cdot 2\pi \cdot \theta$$

$(p = 0, 1, \ldots j^2 = -1)$

The position error signal does not include frequency components of $\theta, 2\theta, 3\theta, \ldots$. That is, the magnetic head follows the track eccentricity.

In the first and second embodiments, the functions of the sine-wave digital filter 3, the compensation digital filter 9 and the stabilization digital filters 4 and 10 can be carried out by means of a micro-processor by solving a difference equation.

As described above, the head positioning system according to the present invention can position the magnetic head at the center line of a target track with a high degree of accuracy. As a result, three times the track density can be achieved compared with that of a conventional floppy disk drive.

I claim:

1. A head positioning system for positioning a magnetic head at a target track of a magnetic disk which rotates at a disk rotational frequency, comprising: a drive motor for driving said magnetic head in a radial direction of said magnetic disk, a position error detector for generating a position error signal which indicates a deviation of said magnetic head with respect to a center line of said target track, a compensation digital filter for generating a compensation signal having a frequency equal to an integer multiple of said disk rotational frequency, a stabilization digital filter connected to said position error detector and said compensation digital filter for generating an equilibrium point signal of said drive motor in accordance with said position error signal and said compensation signal, a motor driver for determining drive currents for said drive motor in response to said equilibrium point signal, and means for detecting a position of said magnetic head relative to said center line of said target track and for supplying the head position signal to said position error detector.

2. The head positioning system as claimed in claim 1, wherein said compensation digital filter generates a sine-wave signal whose frequency is twice said disk rotational frequency.

3. The head positioning system as claimed in claim 1, wherein said drive motor is a two-phase step motor, said motor driver determining the drive current applied to each of the phases of said step motor.

4. The head positioning system as claimed in claim 1, wherein said motor driver further includes memory means for storing values of said drive currents in correspondence with said equilibrium point signal.

5. The head positioning system as claimed in claim 1, further comprising an integrator for integrating said position error signal at predetermined sampling times and supplying an integrated value of said position error signal to said compensation digital filter and said stabilization digital filter.

6. The head positioning system as claimed in claim 1, wherein said compensation digital filter further comprises a plurality of shift registers equal in number to the number of sectors on said floppy disk, said shift registers are serially connected, the content of the last shift register is added to said position error signal and is stored in the first shift register, and outputs of said compensation digital filter are obtained from the outputs of each of said shift registers.

7. The head positioning system as claimed in claim 3, said motor driver further comprising read only memories (ROMs) for storing current value to be applied to the two phases of said drive motor and receiving said equilibrium point signal, digital to analog converters for converting said current values outputted from said read only memories, low pass filters receiving the outputs of said digital analog converters, and amplifiers for amplifying the output signals from said low pass filters and generating the said drive currents for said drive motor.

* * * * *

UNITED STATES PATENT AND TRADEMARK OFFICE
CERTIFICATE OF CORRECTION

PATENT NO. : 4,788,608

DATED : November 29, 1988

INVENTOR(S) : Takahiko TSUJISAWA

It is certified that error appears in the above-identified patent and that said Letters Patent is hereby corrected as shown below:

COLUMN 4, LINE 38    Delete "equilibrium" and insert --equations--.

COLUMN 5, LINE 21    Delete "very" and insert --every--.

Signed and Sealed this

Eighth Day of August, 1989

Attest:

DONALD J. QUIGG

Attesting Officer

Commissioner of Patents and Trademarks